Patented Oct. 6, 1936

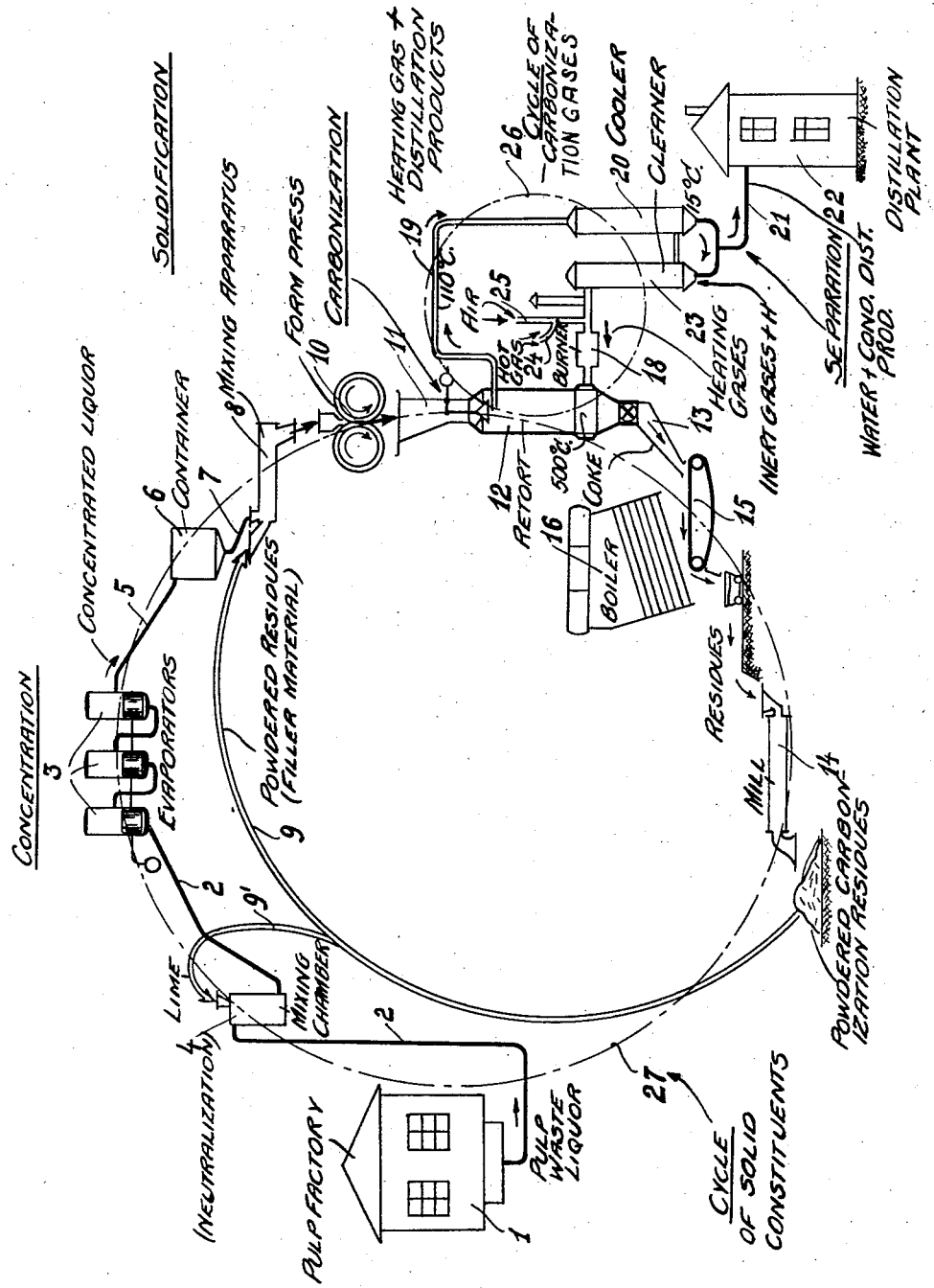

2,056,746

UNITED STATES PATENT OFFICE 2,056,746

METHOD FOR CARBONIZATION OF ALL KINDS OF PULP WASTE LYES

Ernst Strupp, Munich, Germany

Application December 19, 1931, Serial No. 582,189

14 Claims. (Cl. 202—34)

This invention refers to a method of utilizing all kinds of pulp waste lyes by way of carbonization and more especially a materially improved and more economic process.

It is well known that waste liquors derived from the manufacture of pulp according to the alkali (sulphate or soda) process may be utilized by carbonization. To that effect, hitherto as a rule the waste liquor after concentration to a higher density had to be mixed with sodium hydrate and lime, whereupon this mixture in its state or condition resembling that of thick syrup containing a fair quantity of water was again evaporated and carbonized.

On the other hand it is known in handling waste liquors derived from the acid (calciumbisulphite or alkalimonosulphite or alkalibisulphite) process to first precipitate and separate the lignine substances together with calciumsulphite by way of cooking the liquor with lime and then to utilize the remaining solution freed from lignine substances according to the same method as indicated above with reference to alkaline pulp waste lyes.

As to the carbonization proper of the paste-like or syrupy waste lyes, various methods are known. As a rule externally heated retorts are used. The waste lyes in their liquid condition are poured into suitable containers such as pans or plates which are then delivered into said retorts. Furthermore it has been suggested to dry the pulp waste lye completely before subjecting it to carbonization and to carry out such heat treatment within a conveyer worm.

In the known process superheated steam is introduced as a heat carrier in addition to the heating effects radiating from the retort walls. Such superheated steam is further intended to blow the gaseous products of distillation out of the retort. Then the mixture consisting of steam and of the products obtained by the carbonization is condensed in coolers and the output of said distillation products is gained by concentration of the aqueous condensate.

The methods as mentioned above are in fact defective to such an extent that up to the present it has not been possible to carry out the carbonization of pulp waste lyes of all kinds in a successful as well as economical way. The principal disadvantages of said known methods are the following:

(a) The carbonization of the lyes could not be effected continuously but intermittently only;

(b) The processes were unsatisfactory as far as heat economies are concerned because of the addition of aqueous sodium hydrate to the waste liquor which is to be distilled, for obviously the additional water thus introduced into the distillation mass must as well be removed by evaporation, thus resulting in a highly uneconomic process;

(c) The usual way of applying heat to the pulp waste liquor to be carbonized is too slow and not efficient in the case of externally heated retorts because of the low thermal conductivity of the mass. Furthermore with such method of heating great losses inevitably result, inasmuch as a considerable amount of heat is wasted by radiation, conduction and waste gases of the heating plant;

(d) Steam, especially in superheated condition is a very expensive heat carrier, which, according to the known processes, is completely wasted by condensation;

(e) As to sulphite liquor it has hitherto not been possible to effect its carbonization except after difficult and expensive preliminary treatment.

It is an important object of my invention to effect the carbonization of pulp waste lyes of all kinds continuously and with great heat economy, further to eliminate the use of steam as a heat carrier and to avoid the addition of aqueous caustic soda lyes to the waste liquor to be carbonized.

According to the present invention the gases produced in the carbonization of all kinds of pulp waste liquors are repeatedly used as heat carriers in this distillation process. Said gases which contain certain quantities of hydrogen have some heating capacity. Provision is made for their mixture, outside the distillation apparatus, with such an amount of air that the hydrogen contained in the carbonization gases cannot be burned entirely, but that sufficient quantities of it remain as to make the gas a reducing, or at least not an oxidizing factor. The result is that the hydrogen is burned in proportion to the amount of oxygen present in the introduced air. Furthermore according to the invention waste gases of any other heating plants, e. g. of gas or oil burners, are added to said gas and air mixture in such quantities that finally the resulting gas mixture introduced into the distillation apparatus carries so much tangible heat as is necessary for effecting the dry distillation of the pulp waste lyes.

The hot gas mixture is then brought into intimate contact with the pulp waste lyes to be carbonized so that it transmits its heat substantially to the latter with the result that the lyes are subjected to dry distillation, and then leaving same in a substantially cooled state. The drawn off cooled gases being then saturated with distillation products are led through a cooling apparatus whereby they become totally condensed. The distillation products are separated as a substantially concentrated aqueous mixture, whereas the inert gases and the newly generated hydrogen remain uncondensed. These uncondensable gases, after having been washed if necessary, are again treated and used as explained above. Thus a cyclic flow of gases is established which is an important feature of this invention.

For the purpose of bringing the pulp lyes into intimate contact with the heating gases, as indicated above, it is, according to the invention, provided to solidify said lyes into pieces. This may be accomplished in the following manner:

The solid constituents of the pulp waste liquor are not separated as usual by totally drying or evaporating said liquor, but by adding other dry solid material to the waste lye after having concentrated it to about 30° Bé.

According to my invention the distillation residues obtained from the carbonization process proper are utilized as a filler in order to make them moldable into pieces. According to an alternative form of my invention said residues are used for this purpose only after the coke contained therein has first been burnt by a suitable burning process.

It is a further important feature of this invention that another cyclic process is established, since the carbonization residue of the pulp waste lyes, after having been burnt or not, goes back as a filler to the fresh pulp waste lye to be carbonized, it then takes part in the process of carbonization going back and repeating continuously the same performance.

Within the subject idea of the invention it is of importance to use not only such material for solidifying viz. mixing and forming the pulp waste lyes, which does not contain any foreign substances such as ashes, dirt etc., but which originates from the actual carbonization process itself. I have found that only by way of using pulp waste lyes, being solidified and formed by addition of the solid material as indicated above, it was possible to succeed in carrying out the carbonization continuously and to that effect make use of the hot gases obtained from the carbonization as described.

Other features of this invention will become apparent from the disclosures in the specification and the accompanying drawing.

A preferred form of this invention is illustrated by way of example in the drawing and hereafter more fully described.

The drawing shows in essence the various operations involved in the process and the general arrangements of the apparatus as well as the route taken by the materials.

The initial material for my process is the weak pulp waste liquor obtained by either of the well known processes for the manufacture of pulp. As obtained direct from the pulp factory 1 said liquor is as a rule too dilute for immediate use in my process and has accordingly to be concentrated in any well known manner, say by means of vacuum evaporators 3 to about 30° Bé. In case of some acidity of the waste liquor it is advisable to add some alkaline substances to the liquor coming from the factory 1 by using and inserting a mixing chamber 4 into the piping 2, as particularly described later on. The concentrated liquor of about 30° Bé. is then fed through pipe 5 into a container 6 wherefrom it is delivered through pipe 7 into a mixing or kneading apparatus 8 of any kind, where the filler material as shown at 9 is introduced in order to get the liquor to become moldable. The resulting paste is led into a form press 10 of suitable construction where it is completely solidified. Thereupon it is fed continuously through a hopper 11 into a vertical column retort 12 constructed of blocks of iron, from the top of which the formed pieces of solidified liquor slide down by their own weight; after having been subjected to dry distillation and freed from the products which are to be removed, they are led away from the bottom of the column 12 in a suitable way through channel 13 to a mill 14 for crushing purposes; they are then fed back again in powder form (by feeders not shown in the drawing) as a filler (as shown at 9) into the mixing apparatus 8 indicated above. In many instances it may be advisable to burn the coke contained in the solid material leaving the column 12 at its bottom for instance, such coke may be burned on the grate 15 of a steam boiler 16. Thus the filler 9 is freed from organic substances and consists chiefly of pure lime. A part of said residues may be added, as shown at 9' and as well known per se to the acid liquors in container 4.

The heating gas is introduced into the column 12 near its bottom with a temperature of about 660° F. as obtained in chamber 18 in which the gas is burned. It travels inside of column 12 upwards between the pieces of solidified "liquor" and transferring its heat to said pieces, leaving the top of the column at a substantially lowered temperature; it is then fed through pipe 19 to a cooling apparatus 20 where it may arrive at a temperature of about 250° F. and is then brought to about 60° F. so that the water and the distillation products are condensed. The latter are fed through pipe 21 into a distillation plant 22 where they are treated in the usual way. The inert gases and hydrogen may be cleaned or washed with solvent naphtha or the like in a suitable device 23. After this they are mixed with air coming through pipe 25 and, if desired with hot waste gases fed through pipe 24 and again introduced through burner chamber 18 into column 12.

From the description and drawing it is obvious that two cyclic processes are established; the one of the carbonization gases as shown in the diagram by circle 26, the other of the residues as shown by circle 27.

The example given above shows clearly that the method according to the invention is very satisfactory, more especially in regard to heat economies, because the heat capacities of the heating gases are better utilized than for example with retorts externally heated, where, in order to produce an inside carbonization temperature of 660° F., the outer walls must be brought to at least 1470° F.

Moreover nearly the total amount of heat required for the whole process is obtained from the substances treated and no additional fuel expenses are incurred to attain the object of the process.

Furthermore it has been found that with the proceeding according to the present invention acid pulp waste lyes from calciumbisulphite or alkalimonosulphite or alkalibisulphite processes allow carbonization without any difficulty and as easily as with alkaline lyes. The distillation products obtained do not contain any sulphuriferous admixtures or only insignificant ingredients without deleterious effect. Thus the known expensive and difficult preliminary treatment of sulphite waste liquor can be avoided.

I have found that in case of acid pulp waste liquor it has proved of great advantage to add an adequate part of the solid filler to the liquor prior to its evaporation and concentration to about 30° Bé. Thus all difficulties usually met with in evaporating acid lyes are eliminated as well.

The proportion of mixture of the filler (carbonization residues) and fresh waste liquor for solidifying purposes depends upon the nature of the pulp waste liquor in question. 4 parts in weight of residues to 1 part (weight) of lye have by experience been found to be suitable but other proportions may also be applicable.

It is only of importance that after mixing the above constituents a dry granular moldable powder be obtained which may easily be pressed and formed into pieces while still in a substantially warm condition.

What I claim is:

1. The process which consists in mixing pulp waste lye with a loose filler, molding the resulting mass into blocks, bringing said blocks into contact with hot gases to effect carbonization, crushing the solid residue of said carbonization, and returning such crushed residue to constitute the above-mentioned filler for mixture with said lye.

2. The process which consists in mixing pulp waste lye with a loose filler, molding the resulting mass into blocks, bringing said blocks into contact with hot gases to effect carbonization, burning out the coke contained in the solid residue of said carbonization, crushing the solid residue thus treated, and returning such crushed residue to constitute the above-mentioned filler for mixture with said lye.

3. The process which consists in mixing pulp waste lye with a loose filler, molding the resulting mass into blocks, bringing said blocks into contact with hot gases to effect carbonization, withdrawing the gases given off by said blocks during carbonization, heating the gases thus withdrawn and returning them, in their hot condition, into contact with blocks to be carbonized, crushing the solid residue of said carbonization, and returning such crushed residue to constitute the above-mentioned filler for mixture with said lye.

4. The process which consists in mixing pulp waste lye with a loose filler, molding the resulting mass into blocks, bringing said blocks into contact with hot gases of non-oxidizing character to effect carbonization, crushing the solid residue of said carbonization, and returning such crushed residue to constitute the above-mentioned filler for mixture with said lye.

5. The process which consists in mixing pulp waste lye with a loose filler, molding the resulting mass into blocks, bringing said blocks into contact with hot gases of non-oxidizing character to effect carbonization, withdrawing the gases given off by said blocks during carbonization, adding oxygen to the gases thus withdrawn and then burning them to produce hot gases of non-oxidizing character, returning the resulting hot gases into contact with blocks to be carbonized, crushing the solid residue of said carbonization, and returning such crushed residue to constitute the above-mentioned filler for mixture with said lye.

6. The process which consists in mixing pulp waste lye with a loose filler, then concentrating the resulting liquor, mixing the concentrated liquor with an additional amount of said filler, molding the resulting mass into blocks, bringing said blocks into contact with hot gases to effect carbonization, crushing the solid residue of said carbonization, and returning such crushed residue to constitute the above-mentioned filler for mixture with said lye both before and after its concentration.

7. The process which consists in mixing pulp waste lye with a loose filler, then concentrating the resulting liquor, mixing the concentrated liquor with an additional amount of said filler, molding the resulting mass into blocks, bringing said blocks into contact with hot gases to effect carbonization, burning out the coke contained in the solid residue of said carbonization, crushing the solid residue thus treated, and returning such crushed residue to constitute the above-mentioned filler for mixture with said lye both before and after its concentration.

8. The process which consists in mixing pulp waste lye with a loose filler, then concentrating the resulting liquor, mixing the concentrated liquor with an additional amount of said filler, molding the resulting mass into blocks, bringing said blocks into contact with hot gases to effect carbonization, withdrawing the gases given off by said blocks during carbonization, heating the gases thus withdrawn and returning them, in their hot condition, into contact with blocks to be carbonized, crushing the solid residue of said carbonization, and returning such crushed residue to constitute the above-mentioned filler for mixture with said lye both before and after its concentration.

9. The process which consists in mixing pulp waste lye with a loose filler, then concentrating the resulting liquor, mixing the concentrated liquor with an additional amount of said filler, molding the resulting mass into blocks, bringing said blocks into contact with hot gases of non-oxidizing character to effect carbonization, crushing the solid residue of said carbonization, and returning such crushed residue to constitute the above-mentioned filler for mixture with said lye both before and after its concentration.

10. The process which consists in mixing pulp waste lye with a loose filler, then concentrating the resulting liquor, mixing the concentrated liquor with an additional amount of said filler, molding the resulting mass into blocks, bringing said blocks into contact with hot gases of non-oxidizing character to effect carbonization, withdrawing the gases given off by said blocks during carbonization, adding oxygen to the gases thus withdrawn and then burning them to produce hot gases of non-oxidizing character, returning the resulting hot gases into contact with blocks to be carbonized, crushing the solid residue of said carbonization, and returning such crushed residue to constitute the above-mentioned filler for mixture with said lye both before and after its concentration.

11. The process which consists in mixing pulp waste lye with a loose filler, then concentrating the resulting liquor, mixing the concentrated liquor with an additional amount of said filler, molding the resulting mass into blocks, bringing said blocks into contact with hot gases of non-oxidizing character to effect carbonization, withdrawing the gases given off by said blocks during carbonization, adding oxygen to the gases thus withdrawn and then burning them to produce hot gases of non-oxidizing character, returning the resulting hot gases into contact with blocks to be carbonized, burning out the coke contained in the solid residue of said carbonization, crushing the solid residue thus treated, and returning such crushed residue to constitute the above-mentioned filler for mixture with said lye both before and after its concentration.

12. The process which consists in mixing pulp waste lye with a loose filler, molding the resulting mass into blocks, subjecting said blocks to carbonization, crushing the solid residue of said carbonization, and returning such crushed residue to constitute the above-mentioned filler for mixture with said lye.

13. The process which consists in mixing pulp waste lye with a considerably greater amount of a filler, subjecting the resulting mass to carbonization, and returning the solid residue of said carbonization to constitute the above-mentioned filler for mixture with said lye.

14. The process which consists in mixing pulp waste lye with a filler, in the proportion of about one part (by weight) of lye to four parts of filler, subjecting the resulting mass to carbonization, and returning the solid residue of said carbonization to constitute the above-mentioned filler for mixture with said lye.

ERNST STRUPP.